E. J. STANSON.
VEGETABLE PEELER.
APPLICATION FILED JAN. 15, 1917.
1,337,414.
Patented Apr. 20, 1920.
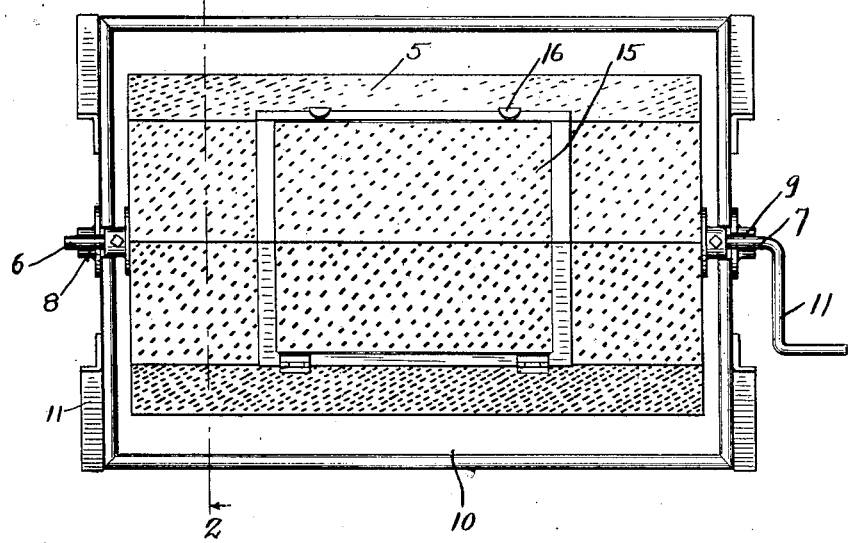
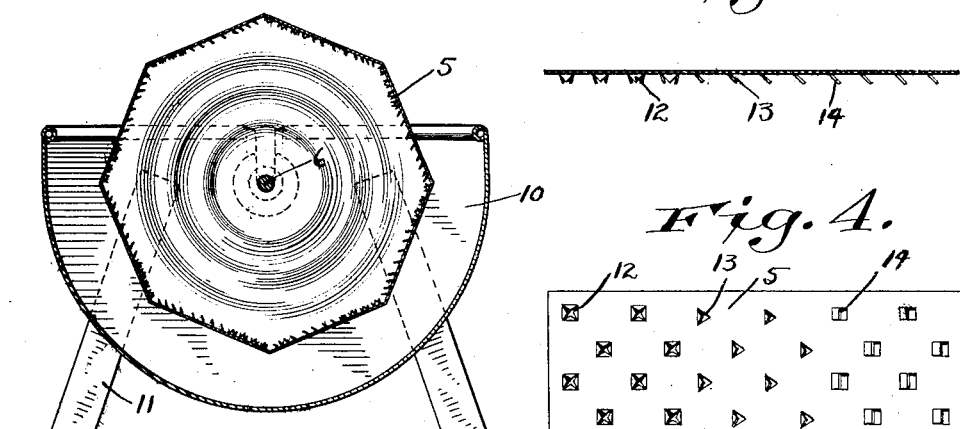
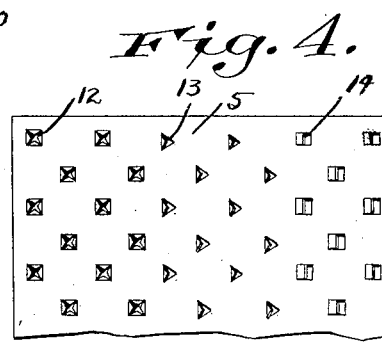
Inventor
Ernest J. Stanson
By Marsell, Keeney & French.
Attorneys.

UNITED STATES PATENT OFFICE.

ERNEST J. STANSON, OF ANTIGO, WISCONSIN.

VEGETABLE-PEELER.

1,337,414.     Specification of Letters Patent.     Patented Apr. 20, 1920.

Application filed January 15, 1917. Serial No. 142,340.

*To all whom it may concern:*

Be it known that I, ERNEST J. STANSON, a citizen of the United States, and resident of Antigo, in the county of Langlade and State of Wisconsin, have invented new and useful Improvements in Vegetable-Peelers, of which the following is a description, reference being had to the accompanying drawings, which are a part of this specification.

The invention relates to vegetable peelers.

The invention is more particularly designed for peeling potatoes or other vegetables in an expeditious manner and is adapted for hotel, restaurant or household use.

Heretofore potato peelers have been devised in which the potatoes are whirled by centrifugal force against an abrasive surface but these are objectionable because of the fact that the potatoes are bruised by striking the abrasive surface with considerable force. To efficiently peel the potatoes or vegetables without bruising them I have provided a drum having an abrasive surface in which the potatoes are placed and tumbled by rotating the drum.

The invention further consists in the several features hereinafter set forth and more particularly defined by claims at the conclusion hereof.

In the drawings:

Figure 1 is a plan view of the device embodying the invention;

Fig. 2 is a section taken on the line 2—2 of Fig. 1;

Fig. 3 is a detail section of the drum;

Fig. 4 is a plan view of a portion of the drum.

In the drawings, the numeral 5 represents the hollow drum which is provided with horizontally disposed trunnions 6 and 7 removably journaled in bearings 8 and 9 in a tank or receptacle 10 provided with angle-iron supporting legs 11, the drum being mounted within the receptacle 10 as shown, the trunnion 7 carrying a crank 11 forming a turning handle.

The drum, preferably made of sheet metal, may be of any desired shape. I have shown a hexagonal drum but any polygonal drum or a circular drum may also be used. This drum is provided with a series of sets of different kinds of projections 12, 13 and 14 which project inwardly to form an abrasive surface with which the vegetables are brought in contact to peel them. The projections 12 are square shaped, 13 triangular shaped and 14 are rectangular shaped, all of said projections coöperating to efficiently accomplish the peeling operation by not only removing the skin but also the eyes of the potato.

The projections 12 roughen and scrape the potato, the projections 13 pick out the eyes and the projections 14 smooth off or put the finishing cut on the potato. The drum is provided with a door 15 pivotally secured thereto and adapted to be held in place by any suitable means such as catches 16, the drum being charged through the door opening.

With the construction above described, the potatoes or other vegetables are placed in the drum and the receptacle is partially filled with water so as to immerse the lower portion of the drum. By providing an inlet and outlet connection to the tank or receptacle 10 and connecting it up with the water supply a continuous supply of fresh water may be maintained in said tank. Now by turning or rotating the drum at a moderate speed the potatoes will be moved up the sides of the drum until their centers of gravity are displaced at which time they fall back to their original position and during the shifting or tumbling of the potatoes within the drum they are subjected to the constant abrasive and cutting action of the projections 12, 13 and 14, and at the end of a few minutes are completely peeled with little waste and the eyes extracted, the water aiding in the peeling operation and serving to clean the peeled vegetables. By reason of the drum rotating in the partially filled water tank the water is kept agitated so that the device may be used where running water is not available.

The invention thus exemplifies a simple, inexpensive and efficient device well adapted for the purposes described.

What I claim as my invention is:

1. A potato peeler comprising a tank, a horizontally disposed hollow polygonal shaped drum journaled in said tank and provided with a plurality of inwardly extending sets of flat edge blades and pointed edge blades, means for permitting access to the drum, and means for turning the drum.

2. A vegetable peeler comprising a tank, a horizontally disposed hollow polygonal shaped drum journaled in said tank and provided with a plurality of inwardly extending sets of square, triangular and rectangular flat edge blades and pointed edge blades, means for permitting access to the drum, and means for turning the drum.

3. A vegetable peeler comprising a tank, a horizontally disposed hollow polygonal shaped drum journaled in said tank and provided with a plurality of inwardly extending pointed projections, the walls of said polygonal shaped drum meeting to form a plurality of angles which cause the vegetable to engage a plurality of projections of adjacent walls and be carried upwardly by said projections until the force of gravity causes the vegetable to become disengaged and roll down one of the walls and come into contact with a plurality of the projections thereby having the skins removed from the vegetable until the vegetable again engages a plurality of projections at a lower angle and is again carried upwardly, means for permitting access to the drum, and means for turning the drum.

In testimony whereof I affix my signature.

ERNEST J. STANSON.